United States Patent Office 3,450,772
Patented June 17, 1969

3,450,772
POLYPHENYL ETHERS
Robert F. Bridger, Hopewell, Robert E. Kinney, Lawrence Township, Mercer County, and Albert L. Williams, Hopewell Township, Mercer County, N.J., assignors to Mobil Oil Corporation, a corporation of New York
No Drawing. Continuation-in-part of application Ser. No. 416,127, Dec. 4, 1964. This application Sept. 24, 1965, Ser. No. 490,072
Int. Cl. C07c 43/28
U.S. Cl. 260—613                                    4 Claims

ABSTRACT OF THE DISCLOSURE

Polyphenyl ether synthetic lubricants are prepared from dihydric phenols directly by reacting the alkali-metal disalt of the dihydric phenol with an aryl halide, using a copper salt catalyst and a polar solvent that complexes with the copper salt. Novel polyphenyl ethers, including hexafluoisopropylidine derivatives are disclosed.

---

This application is a continuation-in-part of copending application Ser. No. 416,127, filed Dec. 4, 1964, and now abandoned.

This application is related to the manufacture of polyphenyl ethers. It is more particularly concerned with a process for preparing such ethers from dihydric phenols directly in one step, and with the preparation of such ether from monohydric phenols by an improved process.

As is well known to those familiar with the art, polyphenyl or polyaryl ethers have been prepared by the Ullmann ether synthesis for use as lubricants in extreme environments. This synthesis involves the reaction between an alkali-metal salt of a monohydric phenol and an aryl halide in the presence of copper metal or a copper salt catalyst. In general, the reaction is carried out at temperatures in the order of 200° C. and higher. Attempts to carry out the Ullmann ether synthesis directly with dihydric phenolic compounds have been unsuccessful, however, because the dihydric phenols are unstable in the presence of alkali under the conditions required for the reaction. For example, resorcinol cannot be reacted with two moles of bromobenzene to form meta-diphenoxybenzene, or even with one mole to form meta-phenoxyphenol. Instead, one hydroxyl group must be blocked, as by converting it to a monoalkyl ether. Then, the remaining hydroxyl group will undergo the Ullmann reaction. After this, the blocking methyl group is removed by reaction with HBr in acetic acid to produce phenoxyphenol, which can then be further reacted in the Ullmann ether synthesis. Usually, the polyphenyl ethers prepared in this manner have poor oxidation stability, because of the presence of small amounts of ring-substituted methyl groups introduced during the formation of the monomethyl ether.

It has now been found that dihydric phenolic compounds can be reacted directly to form polyphenyl ethers and phenoxy phenols, without resort to involved blocking and unblocking operations. It has been discovered that dihydric phenolic compounds will react directly in a polyphenyl ether synthesis, when the reaction is carried out in the presence of a copper salt catalyst, in solvents that form coordinate covalent bonds with copper ions, whereby the copper salt is dissolved, and under conditions to exclude oxygen and molecular oxygen-containing gases from the reaction system. By using this process, certain new polyphenyl ethers have been prepared.

In the Ullmann ether synthesis itself, involving monohydric phenols, reported yields are in the order of 40–60%. It is a further discovery of this invention that by using the aforementioned process, involving use of a solvent that coordinates with and dissolves the copper salt catalyst, markedly improved yields are obtained. Likewise, it will be appreciated that mixed ethers can be made by using both monohydric and dihydric phenol reactants in the same reaction mixture.

Accordingly, it is a broad object of this invention to provide a process for producing polyphenyl (polyaryl) ethers and phenoxy phenols. Another object is to provide a process for producing polyphenyl ethers in improved yields. A further object is to provide a direct method for producing such compounds. A specific object is to provide a direct process for reacting dihydric phenolic compounds in an ether synthesis. A more specific object is to provide a process for reacting dihydric phenolic compounds in an ether synthesis without resorting to involved blocking and unblocking operations. Another specific object is to provide new polyphenyl ethers. A further specific object is to provide a process for producing polyphenyl ethers from monohydric phenols in markedly improved yields. Other objects and advantages of this invention will become apparent to those skilled in the art, from the following detailed description.

In general, the present invention provides a method for carrying out a polyaryl ether synthesis that comprises reacting in the absence of molecular oxygen, an alkali metal salt of at least one phenol reactant selected from the group consisting of a monohydric phenolic compound reactant and a dihydric phenolic compound reactant with an aryl halide reactant in the presence of a copper salt catalyst and in a solvent that forms coordinate covalent bonds with copper ions.

This invention also provides new compositions of matter selected from the group consisting of 2,7-diphenoxynaphthalene; meta - bis(para - acetyl - phenoxy)benzene; ethers having the formula:

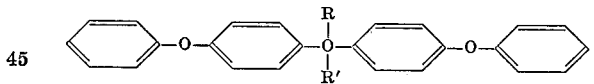

wherein R and R' are alkyl groups having 1 to 4 carbon atoms and meta-isomers of said ethers; and ethers having the formula:

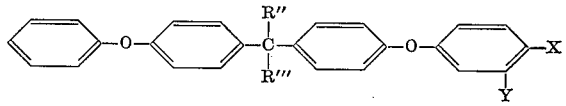

wherein X and Y are selected from the group consisting of a hydrogen atom, a phenoxy radical, and a p-(p-phenoxyhexafluorocumyl) phenoxy radical, and R'' and R''' are fluoroalkyl groups having 1 to 4 carbon atoms.

In carrying out the process of this invention, it is essential that oxygen and molecular oxygen-containing gases be excluded. Thus, the process must be carried out in the absence of molecular oxygen. This can be accomplished by various means well known to those skilled in the art. For example, the process can be carried out under a blanket of inert (to the reaction) gases, such as nitrogen and flue gas.

Various monohydric phenolic compound reactants can be reacted with an aryl halide reactant in accordance with this invention. The aromatic nucleus can be benzene or it can be a condensed ring aromatic nucleus, such as naphthalene and phenanthrene. The monohydric phenolic compound reactant can, if desired, contain ring substituents, such as aryl, alkyl, aroxy, alkoxy, chloro, fluoro, acyl, ester, and nitro groups. Non-limiting examples of the monohydric phenolic compound reactants are phenol; m-amoxyphenol; phenoxyphenol; p-butoxyphenol; o-butylphenol; p-tert-butylphenol; o-chlorophenol; 2-chloro-4-nitrophenol; 6-chloro-2-phenylphenol; p-cyclohexylphenol; 2,4-dichlorophenol; p-ethoxyphenol; m-ethylphenol; o-iodophenol; o-nitrophenol; m-phenylphenol; p-propylphenol; p-hydroxyacetophenone; α-naphthol; β-naphthol; 2-butyryl - 1 - naphthol; 1-chloro-2-naphthol; 1-methyl-2-naphthol; 4-nitro-1-naphthol; 2-phenanthrol; 4-phenanthrol; and 9-phenanthrol.

A wide variety of dihydric phenolic compound reactants can be reacted with an aryl halide reactant in accordance with this invention. The hydroxyl groups can be on the same aromatic nucleus or on different aromatic nuclei on the molecule. In the latter case the aromatic nuclei can be joined directly (e.g., diphenyl) or through a linking molecule (e.g., diphenylether, diphenylpropane, and diphenylhexafluoropropane). The dihydric phenolic compound reactants can, if desired, contain ring substituents such as aryl, alkyl, aroxy, alkoxy, chloro, fluoro, trifluoroalkyl, acyl, ester, and nitro groups. Non-limiting examples of the dihydric phenolic compound reactants are resorcinol; catechol; hydroquinone; 2,2′-dihydroxydiphenyl; 2,4′-dihydroxydiphenyl; 2,7-dihydroxynaphthalene; 3,4-dihydroxyphenanthrene; 4-methoxyresorcinol; 4-methylresorcinol; 4-benzoylresorcinol; 4-isobutylresorcinol; 2-methoxyresorcinol; 2,4-dinitroresorcinol; 2-acetylhydroquinone; 3,3′ - dimethyl-p,p′-biphenol; bis(p-hydroxyphenyl) ether; bis(4-hydroxy-3-nitrophenyl)ether; bis(4-hydroxy-3-chlorophenyl)ether; bis(p-hydroxyphenyl)methane; 1,2-bis(m-hydroxyphenyl)ethane; 2,2-bis(m-hydroxyphenyl) butane; 2,2-bis(p-hydroxyphenyl)-4-methylpentane; 2,2-bis(m-hydroxyphenyl)-n-heptane; 2,2-bis(4-hydroxy-3-isopropyl)propane; bis(4 - hydroxy-3-chlorphenyl)methane; bis(4-hydroxy-5-nitrophenyl)methane; bis(4-hydroxy-2,6-dimethyl-3-methoxyphenyl)methane; 2,2 - bis(p-hydroxyphenyl)hexafluoropropane; 2,2-bis(m-hydroxyphenyl)octafluorobutane; 2,2-bis(p-hydroxyphenyl)tetradecafluoroheptane; 2,2-bis(4-hydroxy-3-isopropylphenyl)hexafluoropropane; and bis(4-hydroxy-3-chlorophenyl)hexafluoropropane.

In order to undergo the polyphenyl ether synthesis, in occordance with this invention, monohydric or the dihydric phenolic compound reactant is converted into its alkali metal salt. This can be accomplished by known methods of reacting the hydroxyl group with a basic alkali metal compound such as the alcoholate (methoxide), hydride, or hydroxide. Although any basic alkali metal compound can be used, the sodium and potassium compounds are generally used and are preferred. When both hydroxyl groups of a dihydric phenol are to be reacted with an aryl halide, both must be converted to the alkali metal salt, i.e., using substantially stoichiometric amounts of the basic alkali metal compound. If, on the other hand, it is desired to leave one hydroxyl group unreacted, as in the preparation of a phenoxyphenol for example, this can be encouraged by leaving a portion of the hydroxyl groups free. An excess of basic compound should be avoided, because it interferes with the reaction and reduces yield. Water also slows the reaction and reduces yield. Accordingly, as when aqueous KOH or NaOH is used, steps should be taken to remove water, such as by azeotropic distillation with benzene, toluene, or the like.

A large number of aryl mono- or di- halide reactants will undergo reaction in accordance with this invention. Although chlorides, bromides, or iodides are utilizable, the bromides are usually preferred. Aryl chlorides are slower reacting than the bromides. Hence, when the aryl nucleus has both chloro and bromo substituents, the reaction is substantially selective for the bromo group, leaving the chloro group intact. The aromatic nucleus of the aryl halide reactant can be substituted, if desired, with substituents, such as aryl, alkyl, aroxy, alkoxy, fluoro, perfluoroalkyl, acyl, ester, or nitro groups. Non-limiting examples of the aryl halide reactant include bromobenzene; chlorobenzene; iodobenzene; 1-bromo-4-chlorobenzene; 5-bromoacenaphthene; 3-chloroacenaphthene; o-bromoanisole; bromoacetophenone; o-iodoanisole; 1,2-dinitro-4-bromobenzene; m-chlorodiphenyl; p-bromodiphenyl; p-bromochlorobenzene; α-napthylbromide; β-naphthylchloride; m-bromonitrobenzene; 1-chloro-4-nitronaphthalene; o-bromophenetole; p-chlorophenetole; m-bromotoluene; 5-bromo-m-xylene; 2-chloro-p-xylene; m-dibromobenzene; m - diiodobenzene; p-dibromobenzene; 2,3-bis(4-bromophenyl)ether; 2-bromophenylether; 2 - bromo - 6 - chloronaphthalene; 1,4-dibromonaphthalene; 2,5-dibromotoluene; 3-bromo-4-chloronitrobenzene; and 2,6-diiodonaphthalene.

In accordance with this invention, the reaction between the alkali metal salt of the monohydric or the dihydric phenolic compound reactant and the aryl halide reactant is catalyzed by copper salts. Cupric and cuprous salts can both be used. Utilizable catalysts include cuprous chloride, cupric chloride, cuprous bromide, cupric bromide, cupric acetate, cupric sulfate, cupric acetylacetonate, and cuprous sulfate. As discussed hereinbefore, water appears to slow the reaction and decrease yields. Accordingly, in preferred practice of this invention, anhydrous copper salts should be used. The amount of catalyst used does not appear to be a critical factor. In practice, the process of this invention has been carried out using as little as 0.01 mole copper salt and as much as 0.25 mole per mole dihydric phenolic compound reactant.

An essential aspect of the process of this invention is the use of a suitable solvent. The solvents utilizable herein are characterized by the fact that they are polar organic solvents that form coordinate covalent bonds with copper ions. Thus, they will contain heteroatoms, such as sulfur, oxygen, nitrogen, and phosphorous. The utilizable solvents dissolve at least part of the copper catalyst and the phenate salt reactant. Types of solvents that are useful include aliphatic and aromatic amines: amine oxides; lactams; amides, sulfoxides; sulfones; heterocyclic oxygen, sulfur, and nitrogen compounds; phosphorus compounds; and ethers. The suitability of any particular solvent for use in the process of this invention can be readily determined by those skilled in the art. Upon adding a copper salt, e.g., cuprous chloride, to a portion of the solvent and warming, a characteristic blue or green color of the Werner coordination complex becomes evident with solvents utilizable herein and at least a portion of the copper salt dissolves. Non-limiting examples of solvents are amylamine; di-n-propylamine; di-n-butylamine; 2-ethylhexylamine; n-decylamine; aniline; N-amylaniline; m-ethylaniline; toluidine; caprolactam; N,N-diethylformamide; N,N-dimethylformamide; N-ethylacetamide; dimethyl sulfoxide; dipropyl sulfoxide; diheptyl sulfoxide; dimethyl sulfone; diethyl sulfone; di-n-propyl sulfone; pyridine; pyridine-N-oxide; quinoline-N-oxide; coumarone; benzothiophene; indole; collidine; pyrazole; thiazole; 2,3-dimethylthiophene; 2-methylthiophene; 1-methyl-2-pyrrolidinone; hexamethyl phosphoramide; di-n-butylether; di-iso-amylether; diheptylether; and bis(2-methoxyethyl)ether.

The amount of solvent used in the reaction of this invention does not appear to be a critical factor. There should be used an amount sufficient to provide easy handling of reactants and products, and to at least partially dissolve the catalyst complex and the phenate salt reactant. It will be noted that complete solution of the catalyst and the phenate salt are not necessary, because, as reaction takes proceeds, additional solution can take place until reaction is substantially complete.

On the other hand, an excessive amount of solvent can slow the reaction rate. Typical, feasible amounts of solvent for various catalysts and phenol salt reactants are illustrated in the specific working examples.

The process of this invention is readily carried out at temperatures between about 50° C. and about 200° C. Higher temperatures can be used, but they generally serve no useful purpose. Preferably, temperatures between about 100° C. and about 175° C. will be used. In many cases, operating at or near refluxing temperature is satisfactory, such as with pyridine (about 117° C.). The time of reaction will be between about one hour and about 200 hours. As in most chemical processes, the temperature and time of reaction are inversely related. A major factor influencing time of reaction is the aryl halide reactant used. As mentioned hereinbefore, the chlorides are slower to react and, therefore, can require up to 200 hours. On the other hand, when bromides are used, reaction time can be between about 3 hours and about 15 hours.

The products made by the process of this invention can be separated from the reaction mixture by techniques well known to those skilled in the art. In general, as much of the solvent as possible is distilled off and the remaining reaction mixture is contacted with acidified water to remove the catalyst. In the case of water-soluble solvents (e.g., dimethyl sulfoxide), any remaining solvent will dissolve in the aqueous phase. When using basic solvents (e.g., pyridine), there should be sufficient acid used to neutralize the solvent remaining. Then, the crude product is extracted with a paraffinic or aromatic hydrocarbon solvent (e.g., hexane, pentane, heptane, benzene, and toluene). In general, the reaction products are obtained as the residue, after unreacted material and by-products have been removed. Products that have hydroxyl groups, i.e., acidic products, such as phenoxyphenol can be separated by extraction with aqueous caustic. Neutral products can be purified by distillation or by recrystallization from acetone, alcohol, light petroleum solvents, aromatic hydrocarbons, etc. Typical techniques are demonstrated in the specific examples, infra.

The process of this invention permits the use of dihydric phenolic compounds in the synthesis of polyaryl ethers without the necessity of resorting to the use of blocking groups and of a plurality of process steps. Thus, various polyaryl ethers can be prepared directly. Some of these, such as those from bisphenols, are believed to be new compounds. Many known polyphenyl ethers, however, can now be made directly either by using both hydroxyl groups of dihydric phenolic compound, e.g., meta-diphenoxybenzene or by using only one hydroxyl group, e.g., meta-phenoxyphenol. In general, both types of compounds are formed, but one will predominate. Several factors influence which product predominates. Thus, if the predominant production of the phenoxyphenol type is desired, it can be effected by converting the dihydric phenolic compound to the mono-alkali metal salt. It also appears that oxygen-containing solvent compounds, e.g., dimethylsulfoxide, generally influences predominance of this type. On the other hand, amino solvent compounds, e.g., pyridine, generally appear to influence reaction on both hydroxyl groups to give neutral polyaryl ethers. Also, the use of short reaction times at low temperatures favors phenolic compound formation.

The following examples are for the purpose of illustrating the process of this invention. It is not to be limited to the reactants and solvents used in the examples. As will be apparent to those skilled in the art, a variety of other reactants and solvents can be employed.

Example 1

A suspension of 10.6 g. (0.196 mol) of sodium methoxide in 200 ml. of benzene was prepared by stirring under a pure nitrogen stream in a 500 ml. flask. The flask was also fitted with a stirrer, a dropping funnel, and a condenser arranged for distillation. All reactions in the flask are carried out under nitrogen. Then, 11.0 g. (0.100 mol) of resorcinol were aded. Heat was applied and benzene and methanol were distilled off to leave a white powder of the resorcinol salt. When the salt had cooled the condenser was arranged for reflux, taking care to exclude air. Then, 200 ml. of pyridine were added. The stirred mixture was brought to reflux and 42 ml. (0.40 mol) of bromobenzene were added in a stream through the dropping funnel. This was followed at once by the addition of 3.0 g. of cuprous chloride. The reaction mixture was brought back to reflux (117° C.) and held at reflux for nine hours under a blanket of nitrogen. After this period of heating, the reaction mixture was poured into 600 ml. of water containing 20 ml. of hydrochloric acid. Additional hydrochloric acid was added until the mixture showed acid to pH paper. The product was extracted into four 200 ml. portions of n-pentane. The pentane solution was freed of solids by filtration. Removal of the n-pentane by distillation left 42.8 g. of residue. Distillation at 0.1 mm. of mercury removed the bromobenzene from the residue. The crude product remaining (20 g.) crystallized on cooling. These crystals were recrystallized from 95% ethanol to give 18.4 g. (70% yield based on resorcinol) of purified metadiphenoxybenzene melting at 60.0–60.5° C. (literature M.P. is 61.5° C.). The identity of the product was confirmed by comparison of the gas chromatogram and the infrared spectrum with those of an authentic sample.

*Analysis.*—Calculated: C, 82.42%; H, 5.38%. Found: C, 82.29%; H, 5.58%.

Example 2

A solution of 16.0 g. (0.286 mol) of potassium hydroxide in 50 ml. of water was placed in a 250 ml. flask fitted with a stirrer, nitrogen inlet tube, thermometer, and a condenser arranged for distillation. A slow stream of pure nitrogen was passed through this flask throughout the run. Then 16.5 g. (0.150 mol) of resorcinol were added. The resorcinol dissolved upon stirring. After addition of 100 ml. of benzene, water was removed by azeotropic distillation into a trap. Benzene remaining was then distilled out. To complete removal of water, distillation into a trap was repeated using 100 ml. of toluene. Then, 125 ml. of methyl sulfoxide were added and the remaining toluene was removed by finally taking the mixture to 150° C. under the stream of nitrogen. The condenser was arranged for reflux and 57 g. (0.363 mol) of bromobenzene were added in a stream through the dropping funnel. This was followed at once by the addition of 0.4 g. of cuprous chloride. The reaction mixture was stirred and held overnight (16 hours) at 110° C. The temperature was then brought up to 150° C. and held there for four hours with continued stirring under the nitrogen blanket. Unreacted bromobenzene and almost all the dimethyl sulfoxide were then removed by distillation at a pressure of 50 mm. of mercury. The residue was poured into 100 ml. of water, and the organic layer extracted into 50 ml. of benzene. The layers were separated and the water layer again extracted with 30 ml. of benzene. The combined benzene layers were washed with four 50 ml. portions of water. Benzene was then removed by distillation to give 17.0 g. of crude products. Gas chromatography showed an 18% conversion to meta-diphenoxybenzene (based on resorcinol) plus a 27% conversion to meta-phenoxyphenol (based on resorcinol) when comparisons were made against authentic samples. A portion of the crude product was extracted by a 10% solution of potassium hydroxide in water. The acid product was then liberated by acidification with hydrochloric acid. The acidic oil thus obtained gave a gas chromatogram and an infrared spectrum corresponding to those of an authentic sample of meta-phenoxyphenol.

*Analysis.*—Calculated: C, 77.40%; H, 5.41%. Found: C, 77.50%; H, 5.40%.

The neutral product not extracted by NaOH was recrystallized from absolute ethanol to give white crystals of meta-diphenoxybenzene melting at 61.5° C. (literature M.P. is 61.5° C.). The identity of the product was confirmed by comparison of the gas chromatogram and the infrared spectrum with those of an authentic sample.

*Analysis.*—Calculated: C, 82.42%; H, 5.38%. Found: C, 81.71%; H, 5.45%.

Example 3

Sodium hydride (4.57 g., which is equivalent to 0.19 mol) was added as an n-pentane dispersion to 100 ml. of methyl sulfoxide. The addition was carried out in a 500 ml. flask under nitrogen stream. The mixture was heated to 60° C. until the evolution of hydrogen ceased. Then 11.0 g. (0.100 mol) of catechol were added in solution in 100 ml. of dimethyl sulfoxide. During all operations the reaction mixtures are protected by a stream of pure nitrogen. The temperature was brought up to 150° C., completing the removal of the pentane. The condenser was arranged for reflux and stirring was continued. Then, 42 ml. of bromobenzene (0.40 mol) were added in a stream through the dropping funnel. This was followed at once by the addition of 5.0 g. of cuprous chloride. The reaction mixture was brought back to 150° C. and held at this temperature with stirring under a nitrogen blanket for 19 hours. The reaction mixture was then poured into 500 ml. of water containing 10 ml. of concentrated hydrochloric acid. The organic layer was extracted by two 200 ml. portions of benzene. To the combined benzene extracts there was added one liter of n-pentane. Some tar which precipitated was filtered off and discarded. The pentane layer was washed with three 100 ml. portions of 5% aqueous sodium hydroxide solution to remove orthophenoxyphenol. Acidification of the base extract yielded ortho-phenoxyphenol which was extracted into n-pentane. Evaporation of the pentane yielded 3.03 g. (16% yield based on catechol) of crude ortho-phenoxyphenol. Recrystallization of the crude product from 95% ethanol yielded 1.60 g. (8.6% yield) of ortho-phenoxyphenol melting at 107° C. (literature M.P.=106–107° C.).

*Analysis.*—Calculated: C, 77.40%; H, 5.41%. Found: C, 77.06%; H, 5.39%.

Example 4

A suspension of 10.3 g. (0.190 mol) of sodium methoxide in 250 ml. of benzene was prepared by stirring under a pure nitrogen stream in a 500 ml. flask. All reactions in the flask are carried out under nitrogen. Then 11.0 g. (0.100 mol) of resorcinol were added. Heat was applied and benzene and methanol were distilled off to leave a white powder of the resorcinol salt. When the salt had cooled the condenser was arranged for reflux. Then 200 ml. of pyridine were added. The stirred mixture was brought to reflux and 74.6 g. (0.300 mol) of para-phenoxyphenyl bromide were added in a stream through the dropping funnel. This was followed at once by the addition of 3.0 g. of cuprous chloride. The reaction mixture was brought to reflux (117° C.) and held at reflux for 8 hours under a blanket of nitrogen. After this period of heating the reaction mixture was poured into 1200 ml. of water. Then 260 ml. of concentrated hydrochloric acid were added with stirring. When the solvents had separated the water layer was siphoned off. The organic layer was taken up in 200 ml. of benzene and filtered free of solids. The solids were washed with 100 ml. of benzene. The benzene solution was washed with 200 ml. of water. Acids were then extracted from the benzene solution by 11.2 g. (0.20 mol) of potassium hydroxide in 200 ml. of water. The benzene solution was then washed with two 150 ml. portions of water. Benzene was then removed by distillation. The para-phenoxyphenyl bromide was then distilled off at 2 mm. mercury pressure. Distillation was continued at 0.1 mm. to yield 30.4 g. of distilled product, which crystallized overnight. These crystals were recrystallized from absolute ethanol to give 25.6 g. (58% yield based on resorcinol) of purified meta-bis(para-phenoxyphenoxy) benzene melting at 86.5°–87.0° C. (literature M.P. is 87.8°–88.9° C.).

*Analysis.*—Calculated: C, 80.69%; H, 4.97%. Found: C, 80.50%; H, 5.06%.

Example 5

A suspension of 10.6 g. (0.196 mol) of sodium methoxide in 200 ml. of benzene was prepared by stirring under a pure nitrogen stream in a 500 ml. flask. All reactions in the flask are carried out under pure nitrogen. Then, 16.0 g. (0.100 mol) of 2,7-dihydroxynaphthalene were added. Heat was applied and benzene and methanol were distilled off to leave a pale yellow powder of the dihydroxynaphthalene salt. When the salt had cooled the condenser was arranged for reflux. Then 200 ml. of pyridine were added. The stirred mixture was brought to reflux and 42 ml. (0.40 mol) of bromobenzene were added in a stream through the dropping funnel. This was followed at once by the addition of 3.0 g. of cuprous chloride. The reaction mixture was brought to reflux (117° C.) and held at reflux for 9 hours under a blanket of nitrogen. After this period of heating the reaction mixture was poured into 600 ml. of water containing 20 ml. of concentrated hydrochloric acid. Additional hydrochloric acid was added until the mixture was shown to be acid to pH paper. Then, the mixture was filtered and solids were washed with two 300 ml. portions of benzene which were added to the filtrate. The benzene layer was separated and treated with decolorizing charcoal for 15 minutes. The charcoal was filtered off and the benzene was evaporated away by warming. Crystals of crude product thus obtained were dissolved in 150 ml. of refluxing ethanol for recrystallization. The crystals were filtered off cold and washed with cold ethanol to yield 14.3 g. (46% yield based on 2,7-dihydroxynaphthalene) of 2,7-diphenoxynaphthalene, a new compound. The product was pale yellow and melted at 106–107° C.

*Analysis.*—Calculated: C, 84.59%; H, 5.16%. Found: C, 83.88%; H, 5.18%.

Example 6

A suspension of 10.2 g. (0.189 mol) of sodium methoxide in 200 ml. of benzene was prepared by stirring under a pure nitrogen stream in a 500 ml. flask. All reactions in the flask are carried out under pure nitrogen. Then 22.8 g. (0.100 mol) of 4,4'-isopropylidenediphenol (Bisphenol A) were added. Benzene and methanol were distilled off to leave a white powder of the di-sodium salt of the diphenol. When the salt had cooled the condenser was arranged for reflux. After addition of 200 ml. of pyridine, the stirred mixture was brought to reflux and 42 ml. (0.40 mol) of bromobenzene were poured into the mixture. This was followed at once by the addition of 2.0 g. of cuprous chloride. The reaction mixture was brought to reflux (117° C.) and held at reflux for 19 hours under a blanket of nitrogen. Then the mixture was poured into a solution of 250 ml. of concentrated hydrochloric acid in 750 ml. of water. This solution was extracted with 400 ml. of benzene in two equal portions. The combined benzene extracts were filtered and then washed with 200 ml. of water. Combined benzene layers were extracted by 250 ml. of 4% aqueous potassium hydroxide in two portions. The benzene layer was then freed of alkali by three water-washes. Benzene was removed by distillation. Unreacted bromobenzene was distilled off at 1 mm. of mercury pressure to leave 34.3 g. of crude product in the pot. The crude product was recrystallized from 800 ml. of absolute alcohol to give 23.1 g. of crystals melting over the range of 56.5–59.0° C. These crude crystals were then recrystallized from 200 ml. of a 50–50 methanol-acetone mixture to yield 17.6 g. (a 46% yield based on Bisphenol A) of 2,2-bis-(para-phenoxyphenyl) propane, a new compound, melting at 60.5–62.0° C.

*Analysis.*—Calculated: C, 85.23%; H, 6.36%. Found: C, 84.97%; H, 6.27%.

Example 7

A suspension of 10.3 g. (0.190 mol) of sodium methoxide in 250 ml. of benzene was prepared by stirring under a pure nitrogen stream in a 500 ml. flask. All reactions in the flask are carried out under nitrogen. Then 11.0 g. (0.100 mol) of resorcinol were added. Benzene and methanol were distilled off to leave a white powder of the resorcinol salt. When the salt had cooled, the condenser was arranged for reflux. Then 200 ml. of pyridine were added. The stirred mixture was brought to reflux and 68.5 g. (0.400 mol) of p-bromotoluene were added in a stream through the dropping funnel. This was followed at once by the addition of 3.0 g. of cuprous chloride. The reaction mixture was brought to reflux (117° C.) and held at reflux for 10 hours under a blanket of nitrogen. After this period of heating the reaction mixture was poured into a solution of 260 ml. of concentrated hydrochloric acid in 2 liters of water. This mixture was stirred and then allowed to stand for two days. The water layer was then siphoned off. The organic layer remaining was then filtered. Solids on the filter were washed with 300 ml. of benzene which were added to the filtrate. The benzene solution was washed with 150 ml. of water in three equal portions. Acids were then extracted from the benzene solution by 11.2 g. (0.20 mol) of potassium hydroxide in 200 ml. of water. The benzene solution was washed with two 50 ml. portions of water. Benzene was removed by distillation. Unreacted p-bromotoluene was distilled off at a pressure of 10 mm. of mercury. Distillation was continued at 0.5 mm. to yield 17.7 g. of product, boiling over the range of 191–193° C. at 0.5 mm. of mercury. The yield of meta-bis(para-methylphenoxy) benzene is 61% based on resorcinol.

*Analysis.*—Calculated: C, 82.73%; H, 6.25%. Found: C, 82.41%; H, 6.23%.

Example 8

A suspension of 10.0 g. (0.185 mol) of sodium methoxide in 150 ml. of benzene was prepared by stirring under pure nitrogen in a 500 ml. flask. All reactions in the flask are carried out under pure nitrogen. Then 11.0 g. (0.100 mol) of resorcinol were added. Methanol and benzene were distilled off to leave the resorcinol salt. When the salt had cooled the condenser was arranged for reflux. A solution of 19.1 g. (0.100 mol) of 1-bromo-4-chlorobenzene in 200 ml. of pyridine was then introduced. The stirred mixture was brought to 110° C. and 3.0 g. of cuprous chloride were added. The mixture was brought to reflux (115° C.) and held at reflux for 10 hours under a blanket of nitrogen. The reaction mixture was then poured into a solution of 250 ml. of concentrated hydrochloric acid and extracted with 150 ml. of benzene. The benzene layer was separated and filtered. The water layer was again extracted with 100 ml. of benzene. Acids were extracted from the combined benzene layers by 10 g. (0.18 mol) of potassium hydroxide in 250 ml. of water. The benzene solution was then washed with four 100 ml. portions of water. Benzene was removed by distillation. The crude product was distilled at a pressure of 0.09 mm. of mercury to give 5.6 g. of a fraction boiling at 175–178° C. The yield of distilled meta-bis(para-chlorophenoxy)benzene is 34%, based on 1-bromo-4-chlorobenzene.

*Analysis.*—Calculated: C, 65.27%; H, 3.65%; Cl, 21.4%. Found: C, 64.97%; H, 3.53%; Cl, 20.3%.

Example 9

A suspension of 10.0 g. (0.185 mol) of sodium methoxide in 200 ml. of benzene was prepared by stirring under pure nitrogen in a 500 ml. flask. All reactions in the flask are carried out under pure nitrogen. Then 11.0 g. (0.100 mol) of resorcinol were added. Methanol and benzene were distilled off to leave the resorcinol salt. When the salt had cooled, the condenser was arranged for reflux. Then 200 ml. of pyridine were added. The stirred mixture was brought to reflux and 75.0 g. (0.400 mol) of para-bromoanisole were poured into the mixture. This was followed at once by the addition of 3.0 g. of cuprous chloride. The reaction mixture was brought to reflux (115° C.) and held at reflux for 10 hours under a blanket of nitrogen. Then the mixture was poured into a solution of 250 ml. of concentrated hydrochloric acid in 750 ml. of water, and extracted with 100 ml. of benzene. The benzene layer was separated and filtered. The water layer was again extracted with 100 ml. of benzene. Acids were extracted from the combined benzene layers by 10 g. (0.18 mol) of potassium hydroxide in 200 ml. portions of water. The benzene solution was then washed by three 100 ml. portions of water. Benzene and bromoanisole were removed by distillation at atmospheric pressure to a pot temperature of 260° C. The crude product in the residue crystallized upon cooling. The crude crystals were dissolved in 30 ml. of hot absolute alcohol. The crystals from cooling by ice-water were filtered off and washed with 30 ml. of cold absolute alcohol. These crystals, melting at 84.5–85.5° C., were again recrystallized from 40 ml. of absolute alcohol to give 18.1 g. of crystals melting at 85.5–86.0° C. The yield of twice recrystallized meta-bis(para-methoxyphenoxy)benzene is 56% based on resorcinol.

*Analysis.*—Calculated: C, 74.52%; H, 5.63%. Found: C, 74.01%; H, 5.71%.

Example 10

A suspension of 9.6 g. (0.178 mol) of sodium methoxide in 200 ml. of benzene was prepared by stirring under a pure nitrogen stream in a 500 ml. flask. All reactions in the flask are carried out under pure nitrogen. Then 11.0 g. (0.100 mol) of resorcinol were added. Benzene and methanol were distilled off to leave the resorcinol salt. When the salt had cooled, the condenser was arranged for reflux. After addition of 200 ml. of pyridine, the stirred mixture was brought to a temperature of 110° C. and 60 g. (0.30 mol) of 4'-bromoacetophenone were added to the mixture. This was followed at once by the addition of 3.0 g. of cuprous chloride. The reaction mixture was brought to reflux (115° C.) and held at reflux for 6 hours under a blanket of nitrogen. The mixture was then poured into a solution of 250 ml. of concentrated hydrochloric acid in 750 ml. of water. The benzene layer was filtered, and washed with 100 ml. of water. The benzene layer was next extracted by 300 ml. of 6% aqueous potassium hydroxide in two portions. Two washes with 150 ml. of water freed the benzene layer of alkali. Benzene was removed by distillation at atmospheric pressure. Unreacted 4'-bromoacetophenone was distilled off at a pressure of 4 mm. of mercury. The residue from this distillation crystallized when cooled to room temperature. These crude crystals were recrystallized from 100 ml. of absolute alcohol to give 19.5 g. of product melting at 98.0–98.5° C. The yield of meta-bis(para-acetylphenoxy) benzene, a new compound, is 60% based on resorcinol.

*Analysis.*—Calculated: C, 76.29%; H, 5.24%. Found: C, 76.03%; H, 5.22%.

A number of other types of solvents are utilizable in this invention. The use of solvents is illustrated in the following examples.

Examples 11 through 22

Using the procedure described in Example 4, a series of runs was carried out using a different solvent in each run. Each run was made at 125° C. except as noted, using 0.05 mol of resorcinol and 0.15 mol of bromobenzene with 1.5 g. of cuprous chloride. Pertinent data and results are set forth in Table I.

TABLE I.—FORMATION OF POLYPHENYL ETHERS IN VARIOUS SOLVENTS

| Ex. | Solvent | Reaction time, hrs. | Percent resorcinol converted | |
|---|---|---|---|---|
| | | | To m-phenoxy-phenol | To m-di-phenoxy-benzene |
| 11 | Methyl sulfoxide | 3 | 50 | 11 |
| 12 | Pyridine | [1] 6 | 15 | 74 |
| 13 | Pyridine +2% water | [2] 6 | 22 | 4 |
| 14 | Dimethylformamide | 6 | 34 | 4 |
| 15 | Di n-butylamine | 6 | 19 | 32 |
| 16 | 1-methyl-2-pyrrolidinone | 6 | 46 | 11 |
| 17 | Bis(2-methoxyethyl)ether | 6 | 25 | 21 |
| 18 | n-Propyl sulfone | 6 | 23 | 42 |
| 19 | Pyridine N-oxide | 3 | 40 | 18 |
| 20 | Hexamethyl phosphoramide | 5 | 47 | 5 |
| 21 | Collidine | 6 | 25 | 17 |
| 22 | n-Hexanol | 6 | 5 | 0 |

[1] Reaction at reflux temperature of 117° C.
[2] Reaction at reflux temperature of 112° C.

In Examples 1 through 22, the effectiveness of the process of this invention has been demonstrated with a number of solvents and reactants. The undesirable effect of water upon the reaction will be at once apparent from comparing the results of Examples 11 and 12.

As described hereinbefore, cupric salts can be used as the catalyst as well as cuprous salts which were used in the examples. Furthermore, the copper must be in the form of a salt, i.e., copper oxide and metallic copper are not utilizable in the process of this invention. These factors are demonstrated in the following examples.

Example 23

A run was carried out as described in Example 11 (methyl sulfoxide solvent), with the exception that cupric bromide was used as the catalyst instead of cuprous chloride and the reaction was carried out at 150° C. There was obtained a yield of 28% meta-phenoxyphenol and 6% m-diphenoxybenzene.

Example 24

A run was carried out as described in Example 12 (pyridine solvent), with the exception that anhydrous cupric chloride (2.0 g.) was used as the catalyst instead of cuprous chloride. There was obtained a yield 25% meta-phenoxyphenol and 59% meta-diphenoxybenzene.

Example 25

A run was carried out as described in Example 12 (pyridine solvent), with the exception that cupric acetylacetonate (3.9 g.) was used as the catalyst instead of cuprous chloride (1.5 g.). There was obtained a yield of 26% meta-phenoxyphenol and 39% meta-diphenoxybenzene.

Example 26

A run was carried out as described in Example 12 (pyridine solvent), with the exception that anhydrous cupric sulfate (3.6 g.) was used as the catalyst instead of cuprous chloride (1.5 g.). There was obtained a yield of 23% metaphenoxyphenol and 71% meta-diphenoxybenzene.

Example 27

A run was carried out as described in Example 11, except that precipitated copper metal was used as the catalyst. No reaction products were obtained. When another run was made using $Cu_2O$ as the catalyst, likewise no reaction products were obtained.

It will be noted from the examples that the synthesis of polyaryl ethers can be carried out in accordance with this invention using a cupric or cuprous salt catalyst. The copper must be in ionic form, in order to effect the formation of a Werner coordination complex with the solvent. Metallic copper and copper oxide (Example 27), as used in prior art practice, are not utilizable herein.

Example 28

A run was carried out as described in Example 12 (pyridine solvent and cuprous chloride catalyst), with the exception that iodobenzene (0.125 mol) was used instead of bromobenzene (0.15 mol). There was obtained a yield of 16% meta-phenoxyphenol and 6% of meta-diphenoxybenzene.

Another class of polyphenyl ethers that can be prepared utilizing the method and techniques of this invention are those having fluorocarbon groups in the chain. These materials, new compounds, have excellent oxidation resistance that is superior to that of polyphenyl ethers generally known. The preparation and properties of these compounds are described in the following examples.

Example 29

The reaction was carried out under a blanket of dry nitrogen gas. There were reacted 50.5 g. (0.15 mole) 2,2-bis(p - hydroxyphenyl)hexafluoropropane (hexafluoroacetone Bisphenol A) with 15.4 g. (0.284 mole) sodium methoxide in benzene. The mixture was heated to distill off methanol and benzene, leaving the dry sodium salt of the hexafluoroacetone Bisphenol A as the residue. Pyridine (250 cc.) was added to the cooled salt and the temperature was raised to 80° C. Then, 94.5 g. (0.6 mol) bromobenzene were added, the temperature raised to 115° C., and 4.5 g. cuprous chloride added. After one hour, 5.0 g. cupric chloride were added and the temperature was maintained at 115° C. for 19 additional hours. The reaction mixture was then cooled, poured into water, and acidified with hydrochloric acid. The water-insoluble crude product was separated, diluted with benzene, and treated with dilute aqueous KOH to remove unreacted hexafluoroacetone Bisphenol A. Benzene and unreacted bromobenzene were distilled off at atmospheric pressure. The distillation was continued at 0.6 mm. mercury pressure to yield 53.8 g. crude product at 162–195° C. The distilled product was treated with sodium methoxide to form the sodium salt of 2-(p-hydroxyphenyl)-2-(p-phenoxyphenyl)-hexafluoropropane present in the crude product. The 2,2 - bis(p - phenoxyphenyl)hexafluoropropane was recovered by extraction into n-pentane. Evaporation of the pentane yielded 32.0 g. of crude crystalline product. This was purified by recrystallization from ethanol. 27.9 g. of 2,2-bis(p-phenoxyphenyl)hexafluoropropane, M.P. 61–62° C., were obtained. This represents 38.2% of the theoretical yield, based on hexafluoroacetone Bisphenol A. used.

*Analysis.*—Calcd. for $C_{27}H_{18}F_6O_2$: C, 66.39; H, 3.72. Found: C, 66.19; H, 3.92.

The pentane-insoluble residue was treated with hydrochloric acid to yield 18 grams of crude 2-(p-hydroxyphenyl) - 2 - (p-phenoxyphenyl)hexafluoropropane. This represents 29% of the theoretical yield.

Example 30

The reaction was carried out under a blanket of dry nitrogen gas. There were reacted 51.3 g. (0.124 mol) 2-(p - hydroxyphenyl)-2-(p-phenoxyphenyl)-hexafluoropropane, prepared as described in Example 29, with 6.2 g. (0.115 mol) sodium mehoxide in benzene. The reaction mixture was stirred and heated to distill off methanol and benzene. Pyridine (200 cc.) was added and the temperature was raised to 110° C. Then, 62.2 g. (0.248 mol) of m-bromophenyl phenyl ether and 3.0 g. cuprous chloride were added. The temperature was maintained at 115° C. for 22 hours. The cooled reaction mixture was poured into water and acidified with hydrochloric acid. The water-insoluble product layer was separated, dissolved in n-pentane, and treated with aqueous KOH to remove unreacted 2 - (p - hydroxyphenyl)-2-(p-phenoxyphenyl)hexafluoropropane. The pentane was evaporated and the crude product distilled at 0.07 mm. using a vacuum jacketed Vigreux column, to separate the 2-(p-phenoxyphenyl) - 2 - (p-(m-phenoxyphenoxy)phenyl)-hexafluoropropane from lower boiling material and high boiling tarry residue. A yield of 41.7 g. of distilled 2-(p-phenoxyphenyl) - 2 - (p - (m-phenoxyphenoxy)phenyl)-hexafluoropropane was obtained. This represents 58% of the theoretical yield based on 2-(p-hydroxyphenyl)-2-(p-phenoxyphenyl)hexafluoropropane used.

*Analysis.*—Calcd. for $C_{33}H_{22}F_6O_3$: C, 68.25; H, 3.83. Found: C, 68.21; H, 3.89.

Example 31

The reaction was carried out under a blanket of dry nitrogen gas. There were reacted 29.3 g. (0.071 mol) of 2-(p-hydroxyphenyl)-2 - (p - phenoxyphenyl)hexafluoropropane, prepared as described in Example 29, with 3.65 g. (0.068 mol) sodium methoxide in benzene. The reaction mixture was stirred and heated to distill off methanol and benzene. Then, 100 cc. of pyridine were added to the cooled salt, the temperature raised to 100° C., and 7.55 g. (0.032 mol) of p-dibromobenzene added. The temperature was then raised to 115° C., and 1.5 g. cuprous chloride added. Reaction was continued at 115° for 23 hours. The cooled reaction mixture was poured into water, acidified with hydrochloric acid, and the water-insoluble crude product extracted into n-pentane. The n-pentane solution was treated with aqueous KOH to extract unreacted 2-(p-hydroxyphenyl)-2-(p-phenoxyphenyl)hexafluoropropane. The n-pentane was evaporated to give 22.6 g. of crude product. Crystallization from alcohol/acetone solutions gave 5.7 g. of purified p-bis(p-(2-p phenoxyphenyl-1,1,1,3,3,3 - hexafluoropropylidene)phenoxy)benzene, M.P. 134.5–135.0° C. This represents 18.1% of the theoretical yield, based on 2-(p-hydroxyphenyl)-2-(p-phenoxyphenyl)hexafluoropropane used.

*Analysis.*—Calcd. for $C_{48}H_{30}F_{12}O_4$: C, 64.13; H, 3.36. Found: C, 63.64; H, 3.26.

The oxidation resistance of these fluoroethers was tested in a Dornte type bulk test oxidation unit at 315° C. Table II compares the time required to absorb 0.5 and 1.0 mol of oxygen per kg. of oil with the time required by a commercial polyphenylether having five benzene rings (mix–5P4E). All the fluoroethers are more stable than the polyphenylether. The outstanding stability occurs in those cases where all oxygen atoms in the molecule are attached to at least one benzene ring bearing a hexafluoroisopropylidene group. This group protects the polyphenyl ether linkage by its proximity. This was further proven by oxidizing a 20% solution of 2,2-bis(p-phenoxyphenyl)hexafluoropropane in the commercial polyphenyl ether (mix–5P4E). No inhibition is observed, the result being that expected from diluting the polyphenyl ether with an inert diluent. A further advantage of these fluoroethers is that they do not exhibit induction periods, followed by rapid absorption of oxygen. The oxidation rate remains at a low, nearly constant level at least out to an up take of 1 mol of $O_2$ per kg. of oil.

The ability of these compounds to lubricate was shown by a steel-on-steel four ball test at 205° C. and 10 kg. load. The product of Example 29, 2,2-bis(p-phenoxyphenyl)hexafluoropropane gave a wear scar of 0.450 mm. diameter, and showed a coefficient of friction of 0.099.

TABLE II

| Product tested at 315° C. | Hours to absorb per kg. of oil | |
|---|---|---|
| | 0.5 mol $O_2$ | 1.0 mol $O_2$ |
| Product of Example 29 | 210 | 340 |
| Product of Example 30 | 34 | 59 |
| Product of Example 31 | 123 | 250 |
| Polyphenyl ether (mix–5P4E) | 10 | 11 |
| 20% product of Example 29 in mix–5P4E | 14 | |

As has been stated hereinbefore, the technique of this invention is advantageous in the Ullmann ether synthesis of polyphenyl ethers from monohydric phenol reactants. The following examples demonstrate the use of this process in the Ullmann synthesis.

Example 32

A two liter flask was fitted with a nitrogen inlet tube, a stirrer, and a one foot Vigreux column. A solution of 279 g. (1.5 mole) of meta-phenoxyphenol (prepared by the condensation of bromobenzene with the mono-sodium salt of resorcinol) was prepared in 800 ml. of dry pyridine. A nitrogen atmosphere covers the reaction mixture during all reactions in the flask. Stirring was continued while 77.2 g. (1.43 moles) of sodium methylate were added. Then 400 ml. of methanol-pyridine mixture were distilled out through the column. When the solution no longer boiled, the column was replaced by a reflux condenser. Then 113 g. (0.478 mole) of mixed dibromobenzene isomers (an equilibrium mixture prepared by isomerization of para-dibromobenzene by aluminum bromide, consisting of 4% ortho, 32% para, and 64% meta-isomers) were added. This was followed by 10 g. of cuprous chloride. The mixture was refluxed with stirring for two hours, and 375 ml. of pyridine were next distilled off. After cooling, the reaction mixture was stirred and acidified by hydrochloric acid diluted with nine parts of water. The aqueous layer was siphoned off, and the organic layer was then dissolved in 500 ml. of benzene. Using a separatory funnel, the benzene solution was washed with 50 ml. of concentrated hydrochloric acid in 600 ml. of water. The benzene solution was next washed with 54 g. of sodium hydroxide in 670 ml. of water, in two equal portions, to recover unreacted meta-phenoxyphenol. Removal of sodium hydroxide solution from the benzene layer was completed by two washes with 170 ml. of water. Benezene was stirpped off at atmospheric pressure, and the distillation continued at reduced pressure through a Claisen head. The mixed bis(meta-phenoxyphenoxy) benzene distilled at 290–300° C. at 0.6 mm. of Hg, and showed 99+% purity of gas chromatography. The yield was 170.3 g. (80% based on mixed dibromobenzenes).

Example 33

A solution of 595 g. (5.5 moles) of para-cresol in 1800 ml. of pyridine was prepared by stirring under nitrogen in a 3 liter flask. All reactions in the flask are carried out under pure nitrogen. The flask was fitted with a 1 ft. long vacuum-jacketed Vigreux column and 283 g. (5.25 moles) of sodium methylate were added while stirring was continued. The mixture was then heated, and 600 ml. of methanol-pyridine mixture were distilled off through the column. When the solution had cooled enough to stop boiling, 325 g. (1.38 moles) of para-dibromobenzene were added, and a condenser arranged for reflux was put in place of the distillation column. This was followed at once by the addition of 20 g. of cuprous chloride. The mixture was held at 110° C. with stirring under nitrogen for 18 hrs. Pyridine was then distilled off into a Dean-Stark trap until 1200 ml. had been removed. The residue was stirred with 500 ml. of benzene, 600 ml. of water, and 400 ml. of concentrated hydrochloric acid for ½ hour. The contents of flask were then transferred to a separatory funnel. The benzene layer was removed, and the aqueous layer again extracted with 1 liter of benzene. Combined benzene layers were filtered. The benzene solution was then extracted by two 1 liter portions of 10% aqueous sodium hydroxide. The benzene layer was washed twice by 500 ml. portions of 10% aqueous sodium chloride. Benzene was removed by distillation. Continuing the distillation at 0.07 mm. Hg gave a fraction boiling at 150–157° C. which weighed 247 g. Gas chromatography showed 99+% purity of p-bis(p-methylphenoxy) benzene in 62% yield, based on para-dibromobenzene. The product melted at 104° C. (literature gives M.P. at 98–100° C.).

*Analysis*—Calculated: C, 82.73%; H, 6.24%. Found: C, 82.66%; H, 6.32%.

Although the present invention has been described with preferred embodiments, it is to be understood that modifications and variations may be resorted to, without departing from the spirit and scope of this invention, as those skilled in the art will readily understand.

What is claimed is:

1. New compositions of matter selected from the group consisting of ethers having the formula:

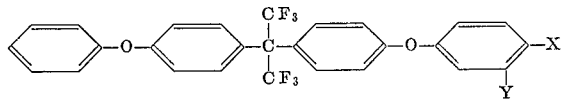

wherein X and Y are selected from the group consisting of hydrogen atom, a phenoxy radical, and a p-(p-phenoxyhexafluorocumyl) phenoxy radical.

2. 2,2-bis(p-phenoxyphenyl)hexafluoropropane.

3. 2 - (p-phenoxyphenyl) - 2 - (p-(m-phenoxyphenoxy) phenyl)-hexafluoropropane.

4. p - bis(p - (2 - p-phenoxyphenyl - 1,1,1,3,3,3, - hexafluoropropylidene)phenoxy)benzene.

References Cited

UNITED STATES PATENTS

| 3,006,852 | 10/1961 | Barnum et al. | 260—613 XR |
| 3,032,594 | 5/1962 | Towle | 260—612 |
| 3,083,234 | 3/1963 | Sax | 260—613 |
| 3,192,263 | 6/1965 | Spiegler | 260—612 XR |
| 3,294,846 | 12/1966 | Livak et al. | 260—613 |
| 3,301,908 | 1/1967 | Ebach et al. | 260—613 |

BERNARD HELFIN, *Primary Examiner.*

U.S. Cl. X.R.

252—54; 260—592